C. G. BIDWELL.
WORK HOLDER.
APPLICATION FILED JUNE 11, 1915.
1,235,957.
Patented Aug. 7, 1917.
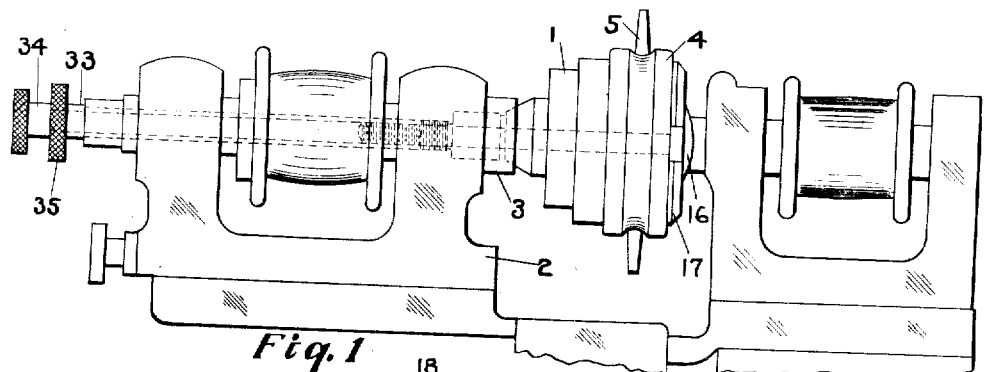
Fig. 1
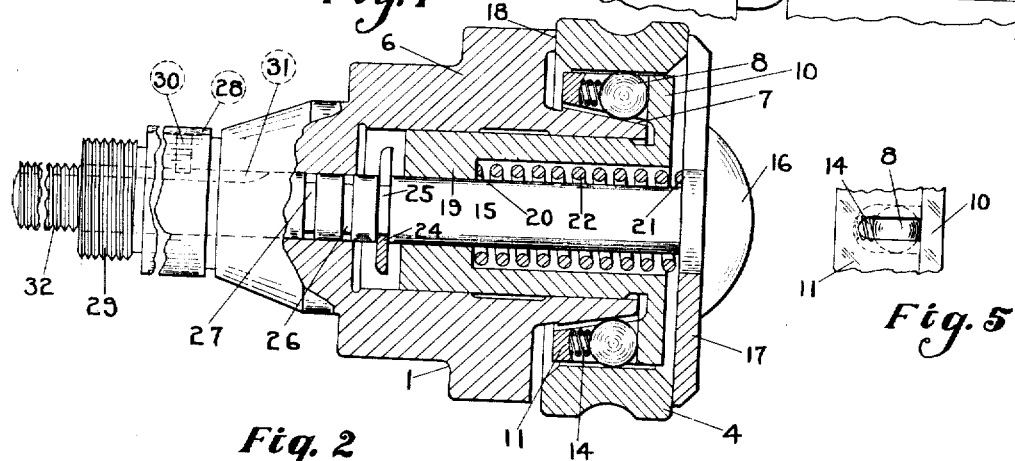
Fig. 2
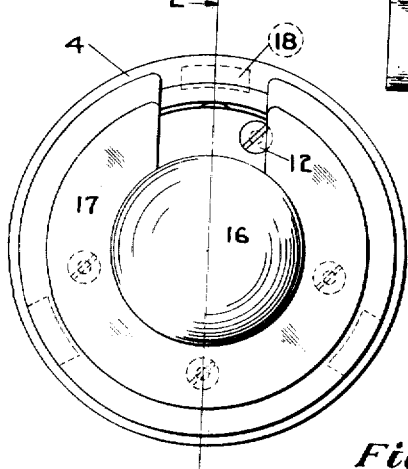
Fig. 3
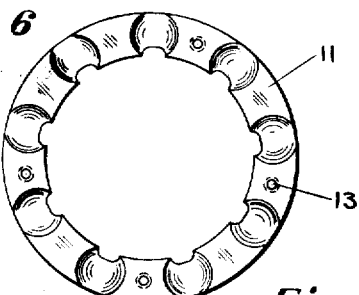
Fig. 5
Fig. 6
Fig. 4
WITNESSES:
Chas. B. Simmons
Harold A. Kingsbury
INVENTOR:
CLARENCE G. BIDWELL,
BY
his ATTORNEY.

UNITED STATES PATENT OFFICE.

CLARENCE G. BIDWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

WORK-HOLDER.

1,235,957.  Specification of Letters Patent.  Patented Aug. 7, 1917.

Application filed June 11, 1915. Serial No. 33,590.

*To all whom it may concern:*

Be it known that I, CLARENCE G. BIDWELL, a citizen of the United States, residing at Bristol, county of Hartford, State of Connecticut, have invented a certain new and useful Work-Holder, of which the following is a full, clear, and exact description, such as will enable others skilled in the art to which it appertains to make and use the same, reference being had to the accompanying drawings, forming part of this specification.

My invention relates to work holders and more particularly to chucks.

In chucks as heretofore constructed and intended for holding a hollow cylindrical piece, as, for example, a race-ring of a ball bearing, which has had one periphery ground to a true circle, in position in the grinding machine to have its other periphery ground concentric with the already ground periphery a difficulty has been that such chucks' constructions were not such as to fit them for carrying and centering the work with that accuracy requisite to the necessary practically absolute concentricity of the two peripheries. This difficulty was particularly apparent in those chucks having a small number, as three, of radially moving sector-shaped jaws and was due to the fact that, except for work having the same internal radius as the radius of the circle of the sectors, the work was grasped at three places only and was further due to the fact that the long arcuate edges of the sectors soon lost their circular curvatures with the result that the radii of the sectors were no longer equal and to the fact that the sectors would twist in the chuck. I have devised a chuck which has a large number of accurate contact elements for contacting and centering the work, these contact elements having small contact areas and being of such a character that should they twist in the chuck the accuracy of the device would be in no way impaired, whereby the chuck is initially, and remains, accurate.

One object of my invention is to provide a chuck which will accurately center the work.

Another object of my invention is to provide a chuck having a large number of contact elements.

Another object is to provide a chuck having balls for contact elements.

Another object is to provide a chuck having contact elements of such a character that even though they twist in the chuck the accuracy of the chuck is not impaired.

Another object is to provide a device of the character indicated which is simple in construction and comparatively inexpensive to manufacture.

To these ends and also to improve generally upon devices of the character indicated my invention consists in the following matters hereinafter described and claimed.

In the accompanying drawings:

Figure 1 is a somewhat conventional side elevation of an oscillating-head grinding machine with a chuck embodying my invention mounted therein and carrying a race-ring of a ball bearing to be ground;

Fig. 2 is a view of the chuck illustrated in Fig. 1 and for the greater part in diametrical cross-section, parts of the chuck shank and the clamping rod being broken away to economize space;

Fig. 3 is an end view and showing the abutments for the work in dotted lines;

Fig. 4 is an end view of the separator;

Fig. 5 is a fragmental view looking down on the edge of the separator, a ball and its spring and a portion of the forcing flange being shown; and Fig. 6 is a view of the spacers that may be used if desired.

Although Fig. 4 shows a separator or retainer adapted to contain nine balls, I have in Fig. 2 slightly distorted the showing to the extent that the balls appear as if diametrically opposite each other as this distortion probably more easily illustrates the action of the balls in centering the work.

Although I have illustrated and more particularly described my invention as embodied in a chuck for holding race-rings of ball bearings, it will be understood that it is by no means restricted to such application.

I illustrate a chuck embodying my invention, designated generally as 1, as carried in the horizontally oscillating-work-head 2 of a grinding machine for rotation with the spindle 3 thereof and carrying the work, race-ring 4, to be ground upon its exterior periphery by the rotating grinding wheel 5, The chuck 1 embodying my invention comprises a block-like portion 6 provided with the male conical taper 7 concentric with the central axis of the chuck and hence, when the chuck is mounted in the grinding machine, concentric with the rotational axis of the spindle 3. A series, say nine, of like-sized balls 8 rest upon the taper 7 in position to be moved longitudinally thereof. When so moved the balls are shifted radially outward or inward. In the illustrated device when the balls are moved to the left in Fig. 2, as by having the flange 10 forced against them, the balls are forced outward into contact with the inner periphery of the work 4.

Of course the illustrated conical taper has its ball contacting surface circular at all points along its length, i. e., the outer periphery of any and each cross section of the taper at right angles to the longitudinal axis of the taper is a circle. Each such circle is concentric with the said central longitudinal axis and the longitudinal elements of the contact surface are all straight lines.

Since the taper 7 is concentric with the axis of rotation and the balls are of like diameter it is evident that the race-ring 4 will be located, as the balls are expanded, with its inner periphery concentric with the axis of rotation.

Since the outer periphery will of course be ground concentric with the axis of rotation it is evident that the inner and outer peripheries will be concentric with each other which is the ultimate result desired.

Since the balls have substantially point-contact with the taper and the work it is evident that should they twist in the chuck the accuracy of the chuck would not be impaired.

Thus a chuck embodying my invention preferably comprises a conical taper, as for example the male taper 7, a series of contact elements of such a character that their twisting in the chuck will not affect the accuracy thereof, as the balls 8 having each comparatively small contact surfaces for contact with the taper and the work, and a means, as the flange 10, for forcing the contact elements along the taper in such a direction as to cause them to be radially moved by the taper into contact with the work to grasp and center it, the contact elements being all of like dimension, as of like diameters, in the direction of their radial movement, and preferably of comparatively large number.

The contact elements of small contact areas are highly desirable as not only does their twisting in the chuck not impair accuracy but also they permit the escape of dust from the taper and the work, and, even though dust be present, do not grind the dust into the taper or into the already ground periphery of the work as would contact elements with large contact areas. A series of a comparatively large number of such contact elements is advantageous because it permits the grasping of the work at a large number of points. Also the circle defined by a large number of acting contact areas is much more accurately defined than would be the case if but few contact elements were used. The result is high accuracy.

I find balls such as are used for ball bearings much to be preferred for contact elements as such balls can be procured varying in diameter something less than .0001 inch each from the other which insures that a true circle absolutely concentric with the taper will be defined by the acting contact areas of the balls. Also, of course, the balls present a large number of different contact points and hence are long wearing.

To insure the utmost accuracy I prefer to provide means for positively maintaining the contact areas which lie in contact with the work, i. e., the acting contact areas, in the same plane, such plane being at right angles to the rotational axis, i. e., a vertical plane in Fig. 2. To this end I have illustrated the balls as carried in a separator 11 of less width radially of the taper than the balls and rigidly connected to the flange 10 as by the screws 12 screwed into the holes 13 in the separator. Behind each ball is mounted, as by being soldered at its rear end to the separator, a spring 14 expanding against the ball and so positively forcing it against the flange 10 but not of a strength sufficiently great to interfere with the free radial movement of the ball in the pocket of the separator. The flange 10 is of course at right angles to the rotational axis being conveniently so held by the sleeve 19 closely fitted in the portion 6 and carrying the flange. The result of this construction is that the centers of the balls lie all in the same plane at right angles to the axis of rotation and therefore all the active contact areas also all lie in a plane at right angles to such axis.

Obviously the pockets of the separator are of such dimensions as to permit the balls to freely turn and to move radially outward and inward to the extent desired to insure proper working. Also the inner face of the flange is dished sufficiently to insure that it will not contact with the end of the taper during such left-hand travel as is necessary to bring the balls into proper contact with race-rings of those sizes with which the device is intended to be used.

I prefer to provide a means in addition to the balls for supplementally holding the work after the balls have centered the work. In the illustrated device a shank or bolt 15 extends through the body of the chuck and carries behind its head 16 a "horse-shoe"

washer or abutment 17 for contact with the work. The other side of the work abuts the block portion 6 of the chuck as upon the lugs or work-abutments 18. The bolt 15 may be drawn strongly to the left in any suitable manner thus grasping the work between the washer 17 and the lugs 18.

An additional holding means, such for example as that just described, aids in holding the work against rotation with respect to the chuck whereby it becomes unnecessary to force the balls against the taper and the work with as great force as might otherwise be necessary and so eliminates a possible source of injury to the surfaces of those parts. Also with such a holding means, grasping the race-ring at its sides, all possibility of the race-ring working loose in the chuck due to its expansion away from the balls under the heat generated in grinding is eliminated. Of course it will be understood that although an additional clamping means is desirable yet the work can be held in place by the balls alone.

As before stated the flange or abutment 10 is conveniently carried by the cylindrical sleeve 19 closely and slidably received in the block portion 6 of the chuck. As illustrated the sleeve 19 is provided with an interior flange 20 while the shank 15 is provided with a shoulder 21 and between them and expanding against them is the expanding spring 22. This spring 22 is of such strength that when the shank 15 is initially drawn to the left the spring does not contract and so the sleeve 19 (and the flange 10) are pushed to the left and the balls forced into contact with the work and the work centered and held in position, after which, upon continued left-hand movement of the shank 15, the spring contracts and the washer 17 comes into action and clamps the work. This spring also acts to force the balls constantly into contact with the race-ring even though the ring tends to expand away from the balls under the grinding heat. It will be understood that the powerfulness of the clamping action of the balls depends merely upon the strength of the spring and may be made as great or small as desired.

Since the active contact areas of the balls lie all in the same plane at right angles to the longitudinal axis of the chuck, *i. e.*, at right angles to the rotational axis—this because the balls when being moved into wedging engagement are all pressed against the flange 10 at right angles to the longitudinal axis of the taper and if preferred, though not necessarily, are positively forced against the flange at all times by the springs 14—it will be clear that the work will not be canted when the balls are forced against it but rather the circle of its inner periphery will lie at right angles to the axis of rotation and absolutely concentric therewith. It will be understood that when additional clamping means, as the abutments 18 and the washer 17, are employed the balls are forced sufficiently hard against the work and taper by the flange 10 to insure that should the additional clamping means by any chance have a tendency to cant the work the clutching action due to the balls will prevent any such canting. In the illustrated device, designed for clamping bearing rings with end faces at right angles to the longitudinal axis of the rings, the faces of the abutments 18 lie in the same plane at right angles to the axis of the taper and to the rotational axis, and the face of the washer lies in a parallel plane whereby there is no tendency for the abutments and washer to cant the work.

Preferably I provide a series of different widthed annular spacers 23, 23, which may be slipped onto the shank 15 and abut the shoulder 21, the spring 22 abutting the end of a spacer instead of the shoulder 21. Thus when work of excessive width is mounted in the chuck and the bolt 15 is shifted considerably to the right in order to accommodate such wide work between the washer 17 and the lugs 18 the spring is kept from unduly expanding.

Preferably also I provide a "horse-shoe" washer 24 to be slipped into the groove 25 in the shank. This washer serves as an abutment for contact with the end of the sleeve 19. Thus when the shank 15 is pushed to the right the washer 24 contacts the sleeve 19 and moves the sleeve to the right and thus causes the balls (carried by the separator) to move down the taper and release the work. I illustrate a series of grooves 25, 26, and 27 into each of which the washer 24 may be placed in turn as greater widthed pieces of work are in turn accommodated and the bolt 15 is in turn initially shifted farther and farther to the right. Desirably the distance between the groove 25 and the groove 26 and the distance between the groove 25 and the groove 27 are substantially equal respectively to the width of the narrow spacer 23 and the width of the wide spacer 23.

The chuck may be mounted in the machine and its bolt or shank 15 may be shifted in any suitable manner. Merely by way of illustration and example I have shown the shank of the block portion of the chuck provided with a keyway 28 and with threads 29, and the bolt 15 keyed to the chuck body by the pin 30 carried in the chuck body and slidably received in the way 31 in the bolt, the bolt being threaded at 32 for any suitable length requisite to give sufficient longitudinal motion. The keyway 28 is of course for the reception of the usual and well known key (not shown) of the spindle to prevent relative rotation of the chuck and spindle while permitting relative sliding. The screw threads 29 are for coacting with the threaded end of the ordinary rotatable internally threaded sleeve 33 of the machine. The screw threads 32 are for coaction with the threaded end of the ordinary rotatable sleeve 34 of the machine received in the sleeve 33. The sleeve 33 is shouldered to abut the rear end of the spindle of the machine and the sleeve 34 is shouldered to abut the hand-wheel 35 of the sleeve 33. By rotating the sleeve 33 the chuck is tightened or loosened in the spindle and by rotating the sleeve 34 the bolt 15 is drawn to the left or pushed to the right, all of course as well understood in the art.

Although the separator 11 holds the balls against disassembly and in an annular series its pockets are enough larger than the balls and of such contour as to permit the balls to move radially in the pockets so as to freely contact the taper and the work in all the various positions which the balls may assume in their travel longitudinally of the taper without interference or hindrance from the separator, or retainer 11.

In operation the bolt 15 and the sleeve 19 are shifted to the right by turning the sleeve 34, the washer 17 is slipped off the bolt (by virtue of the washer's horse-shoe shape), the race-ring is passed over the head 16 and into place abutting the abutments 18, the washer 17 is replaced, and the bolt 15 is drawn to the left by reversely turning the sleeve 34. During the initial left-hand movement of the bolt 15 the spring 22 does not contract and the sleeve 19 is pushed to the left whereby the flange 10 moves the balls along the taper and they wedge between the work and the taper grasping and centering the work, whereupon, the force required to further wedge the balls being greater than the expansive force of the spring, the spring yields and the washer 17 is moved into work-holding coöperation with the abutments 18.

It will of course be understood that although I have illustrated a chuck embodying my invention as having a male conical taper and adapted to grasp a ring upon its interior periphery, rather than as having a female conical taper and adapted to grasp a ring upon its exterior periphery, I do not restrict my invention to devices having a male taper.

It will be seen that I have provided a chuck capable of great accuracy, simple in construction and operation, and comparatively inexpensive to manufacture.

Having thus described my invention what I claim as new and desire to secure by Letters Patent is:

1. In a chuck for holding work centered upon the rotating work head of a machine tool, a portion for connection with said head, a portion providing a conical taper; said portions being so related that when the chuck is connected with said head said taper is concentric with the rotational axis of the head; and an annular series of a relatively large number of contact elements, independently radially movable, in substantially point contact with said taper, and having substantially-point-contact areas for contact with the work, said taper and said elements being mounted for movement with respect to each other longitudinally of said taper; substantially as described.

2. In a chuck for holding work centered upon the rotating work head of a machine tool, a portion for connection with said head, a portion providing a conical taper; said portions being so related that when the chuck is connected with said head said taper is concentric with the rotational axis of the head; an annular pocketed ball separator associated with said taper, and an annular series of a relatively large number of balls, received in the pockets of said separator, independently radially movable therein, in contact with said taper, and arranged for contact with the work, said taper and said balls being mounted for movement with respect to each other longitudinally of the taper; substantially as described.

3. In a work holder, a portion providing a conical taper, an annular series of contact elements in substantially point contact with said taper and having substantially-point-contact areas for contact with the work, and means for holding said contact elements in position upon said taper with their work-contacting areas in a plane at right angles to the longitudinal axis of said taper and locating the circle defined by such areas with all portions of its periphery at the same perpendicular distance from such axis, said taper and said contact elements being mounted for movement with respect to each other longitudinally of the taper; substantially as described.

4. In a work holder, a portion providing a conical taper, an annular series of contact elements in substantially point contact with said taper and having substantially-point-contact areas for contact with the work, and a member carrying an abutment in the character of a flange and having a face for contact with said contact elements, such contact face being at right angles to the longitudinal axis of said taper and in contact with said contact elements at their sides, said taper, contact elements, and member being mounted for movement with respect to each other longitudinally of the taper; substantially as described.

5. A chuck for holding work to be operated on in position upon a machine tool, such chuck including a portion formed for connection with the chuck holding parts of such providing a male conical taper, an annular series of contact elements carried upon and surrounding the exterior surface of said taper, each having substantially point-contact therewith and having substantially point-contact areas for contact with the work to be operated upon, and means for forcing said contact elements along said taper from the small end toward the large end thereof thereby to move said elements radially outward into contact with the work; substantially as described.

In testimony whereof, I hereunto affix my signature, in the presence of two witnesses.

CLARENCE G. BIDWELL.

Witnesses:
HAROLD A. KINGSBURY,
CHARLES R. ANDERSON.

Correction in Letters Patent No. 1,235,957.

It is hereby certified that in Letters Patent No. 1,235,957, granted August 7, 1917, upon the application of Clarence G. Bidwell, of Bristol, Connecticut, for an improvement in "Work-Holders," an error appears in the printed specification requiring correction as follows: Page 6, line 11, claim 12, after the word "work" insert the words *and so place said work in desired relation to the working parts of said tool;* and that the said Letters Patent should be read with this correction therein that the same may conform to the record of the case in the Patent Office.

Signed and sealed this 4th day of September, A. D., 1917.

[SEAL.] R. F. WHITEHEAD,

*Acting Commissioner of Patents.*

Cl. 29—113.